United States Patent
Donahue

(10) Patent No.: US 9,200,589 B1
(45) Date of Patent: Dec. 1, 2015

(54) PISTON ASSEMBLY FOR A RECIPROCATING ENGINE

(71) Applicant: GENERAL ELECTRIC COMPANY, Schenectady, NY (US)

(72) Inventor: Richard John Donahue, West Bend, WI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/298,867

(22) Filed: Jun. 6, 2014

(51) Int. Cl.
*F16J 1/00* (2006.01)
*F02F 3/00* (2006.01)

(52) U.S. Cl.
CPC .................................. *F02F 3/00* (2013.01)

(58) Field of Classification Search
CPC ................. F16J 1/00; F16J 9/12; F16J 9/00
USPC .......................................................... 277/447
See application file for complete search history.

(56) References Cited

U.S. PATENT DOCUMENTS

| | | | |
|---|---|---|---|
| 1,467,256 | A | 9/1923 | Thomson |
| 1,815,418 | A | 7/1931 | Garvin |
| 1,936,430 | A | 11/1933 | Godron |
| 1,959,566 | A | 5/1934 | Brubaker |
| 2,233,723 | A | 3/1941 | Ballard |
| 2,328,912 | A | 9/1943 | Kotzback |
| 2,566,603 | A * | 9/1951 | de Kantzow Dykes ....... 277/447 |
| 2,591,176 | A | 4/1952 | Mason |
| 2,610,098 | A | 9/1952 | Reiners |
| 3,364,675 | A | 1/1968 | Dorer |
| 3,554,564 | A | 1/1971 | Lassanske |
| 3,608,911 | A | 9/1971 | Prasse et al. |
| 3,806,137 | A | 4/1974 | Prasse et al. |
| 4,235,447 | A | 11/1980 | Davison, Jr. |
| 4,358,121 | A | 11/1982 | Sand |
| RE32,395 | E | 4/1987 | Geffroy et al. |

(Continued)

FOREIGN PATENT DOCUMENTS

| | | |
|---|---|---|
| DE | 102008014859 A1 | 10/2009 |
| FR | 1304041 A | 9/1962 |

(Continued)

OTHER PUBLICATIONS

U.S. Appl. No. 14/452,509, filed Aug. 5, 2014, Donahue.

(Continued)

*Primary Examiner* — Lindsay Low
*Assistant Examiner* — Kevin Lathers
(74) *Attorney, Agent, or Firm* — Fletcher Yoder, PC

(57) ABSTRACT

A power cylinder system for a reciprocating engine includes a cylinder with an inner annular wall and defining a cavity having a bore diameter. The system includes a piston assembly having a piston disposed within the cylinder and configured to move in a reciprocating manner. The piston and the inner annular wall of the cylinder are separated by a diametral cold clearance that is less than approximately 0.5 percent of the bore diameter. The piston assembly includes a top-most groove extending circumferentially about the piston beneath a top land of the piston and a ring disposed within the top-most groove. One or more channels are formed in the top land or an upper surface of the ring and are configured to enable combustion gases to flow from the cavity to a space between an inner surface of the top-most groove and an inner face of the ring.

20 Claims, 5 Drawing Sheets

(56) References Cited

U.S. PATENT DOCUMENTS

| | | | |
|---|---|---|---|
| 4,681,326 A * | 7/1987 | Kubo | 277/447 |
| 4,848,212 A | 7/1989 | Kawano et al. | |
| 5,083,536 A | 1/1992 | Ariga | |
| 5,133,563 A | 7/1992 | Casellato | |
| 5,392,692 A | 2/1995 | Rao et al. | |
| 5,430,938 A | 7/1995 | Rao et al. | |
| 5,474,307 A | 12/1995 | DeBiasse | |
| 5,490,445 A | 2/1996 | Rao et al. | |
| 5,564,699 A | 10/1996 | Lawrence et al. | |
| 6,131,503 A | 10/2000 | Takashima | |
| 6,536,385 B1 | 3/2003 | Takashima | |
| 7,730,866 B2 | 6/2010 | Melchior | |

FOREIGN PATENT DOCUMENTS

| | | | |
|---|---|---|---|
| JP | S6124876 A | 2/1986 | |
| NL | 39704 C | 7/1936 | |
| WO | 9730277 | 8/1997 | |

OTHER PUBLICATIONS

U.S. Appl. No. 14/452,515, filed Aug. 5, 2014, Donahue.
U.S. Appl. No. 14/595,013, filed Jan. 12, 2015, Donahue.
U.S. Appl. No. 14/298,864, filed Jun. 6, 2014, Donahue.
U.S. Appl. No. 14/298,869, filed Jun. 6, 2014, Donahue.
European Search Report for Application EP15170677 dated Aug. 7, 2015.
European Search Report for Application EP15170678 dated Aug. 7, 2015.
P. De K. Dykes, Pressure-Backed Piston Rings; Dec. 1951; p. 3, p. 21, p. 22.

* cited by examiner

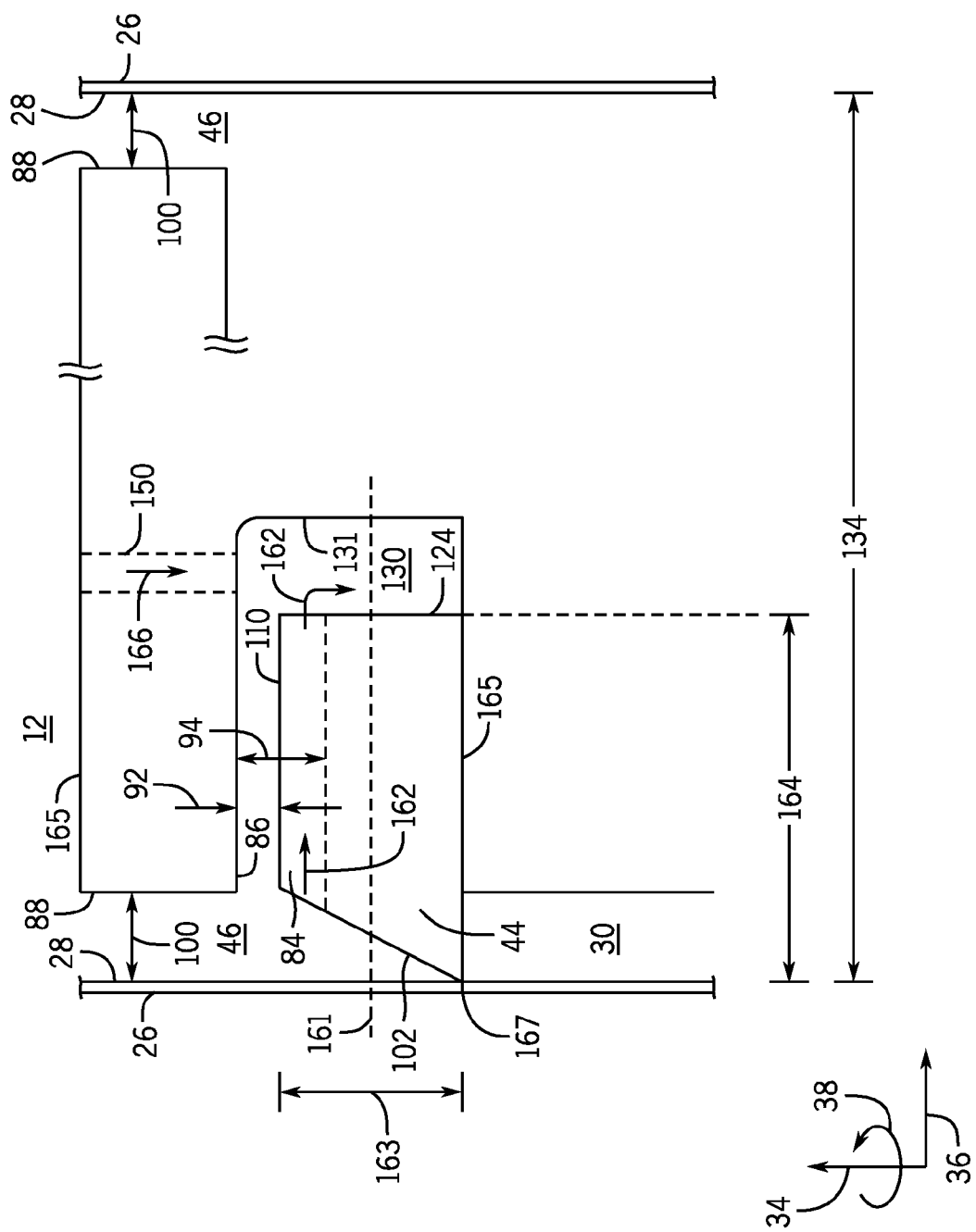

PISTON ASSEMBLY FOR A RECIPROCATING ENGINE

BACKGROUND

The subject matter disclosed herein relates generally to reciprocating engines, and, more particularly to a piston assembly for a reciprocating engine.

A reciprocating engine (e.g., a reciprocating internal combustion engine) combusts fuel with an oxidant (e.g., air) to generate hot combustion gases, which in turn drive a piston (e.g., a reciprocating piston) within a cylinder. In particular, the hot combustion gases expand and exert a pressure against the piston that linearly moves the piston from a top portion to a bottom portion of the cylinder during an expansion stroke. The piston converts the pressure exerted by the combustion gases and the piston's linear motion into a rotating motion (e.g., via a connecting rod and a crankshaft coupled to the piston) that drives one or more loads, e.g., an electrical generator. The construction of the piston and associated structures (e.g., a piston assembly) can significantly impact exhaust emissions (e.g., unburned hydrocarbons) and engine efficiency, as well as lubricant (e.g., oil) consumption. Furthermore, the construction of the piston assembly can significantly affect the operating life of the reciprocating engine. Therefore, it would be desirable to improve the construction of the piston assembly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a power cylinder system for a reciprocating engine includes a cylinder with an inner annular wall and defining a cavity having a bore diameter. The system includes a piston assembly having a piston disposed within the cylinder and configured to move in a reciprocating manner. The piston and the inner annular wall of the cylinder are separated by a diametral cold clearance that is less than approximately 0.5 percent of the bore diameter. The piston assembly includes a top-most groove extending circumferentially about the piston beneath a top land of the piston and a ring disposed within the top-most groove. One or more channels are formed in the top land or an upper surface of the ring and are configured to enable combustion gases to flow from the cavity to a space between an inner surface of the top-most groove and an inner face of the ring.

In one embodiment, a power cylinder system for a reciprocating engine includes a piston configured to form a tight top land clearance between a top land of the piston and an inner annular wall of a cylinder of the power cylinder system when the piston is positioned within the cylinder. The piston assembly also includes a top-most ring groove extending circumferentially about the piston and configured to support a ring. One or more channels are positioned in an upper surface of the top-most ring groove or in an upper face of the ring, and the one or more channels are open to the top-most ring groove and extend inwardly from an outer perimeter of the piston to a space defined between a portion of the top-most ring groove and an inner circumferential face of the ring when the ring is disposed within the top-most ring groove.

In one embodiment, a power cylinder system for a reciprocating engine includes a cylinder having a bore diameter. A piston is positioned within the cylinder, and a tight top land clearance is provided between a top land of the piston and an inner annular wall of the cylinder. A ring is positioned within a top-most groove of the piston beneath the top land of the piston. The cylinder, the ring, and the top land define a top land cavity. One or more radial channels are in fluid communication with the top land cavity and a space adjacent to an inner face of the top ring, and the one or more radial channels are configured to facilitate transfer of combustion gases from the top land cavity to the space.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a partial cross-sectional side view of a portion of an embodiment of a tight top land piston assembly having a radial channel formed in a top piston ring.

DETAILED DESCRIPTION

Figure 1:
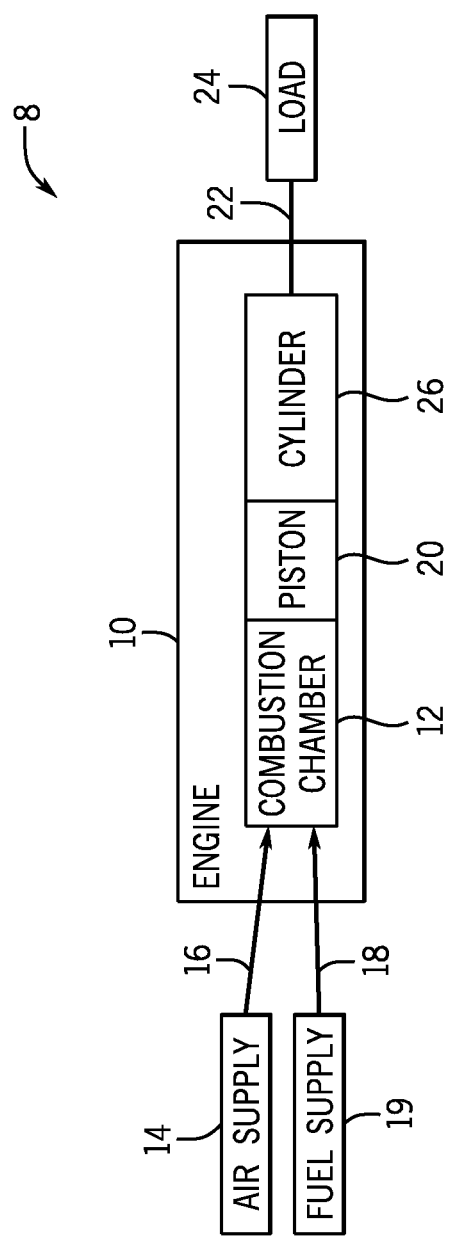
FIG. 1 is a schematic block diagram of an embodiment of a portion of an engine driven power generation system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Power cylinder systems for reciprocating engines (e.g., reciprocating internal combustion engines) in accordance with the present disclosure may include one or more pistons each configured to move linearly within a cylinder (e.g., a liner) to convert pressure exerted by combustion gases and the piston's linear motion into a rotating motion to power one or more loads. Each piston may have a top annular groove (e.g., a top ring groove or a top-most ring groove) extending circumferentially about the piston beneath a top land of the piston. A top ring (e.g., a top piston ring) may be disposed within the top groove. The top ring, the top land, and an inner annular wall of the cylinder define an annular top land cavity. In the disclosed embodiments, one or more channels may be provided to transfer the combustion gases to a space adjacent to an inner face of the top ring to block radial ring collapse, for example. Additionally, a TTL clearance (e.g., a diametral clearance) between a top land of the piston and an inner annular wall of the cylinder (e.g., across the top land cavity) may block formation of carbon deposits within the channels.

Without the disclosed embodiments, a pressure gradient across the top ring may cause radial ring collapse (e.g., movement of the top ring away from the inner wall of the cylinder), increased lubricant (e.g., oil) consumption, increased blowby of unburned hydrocarbons, increased emissions, for example. Thus, embodiments of the present disclosure include one or more channels to transfer high pressure combustion gases to the space adjacent to the inner face of the top ring, such that the transferred gases exert a radially-outward directed force on the inner face of the top ring. However, as noted above, such channels may be susceptible to blockage by carbon deposits that may form during operation of the engine. The formation of carbon deposits in the channels may block transfer of the combustion gases through the channels, and thus, may limit the ability of the channels to stabilize the top ring, for example. To block the formation of carbon deposits within the channels, present embodiments include a TTL piston assembly having the TTL clearance between the top land of the piston and the inner annular wall of the cylinder (e.g., across the top land cavity). As discussed in more detail below, the TTL clearance is a generally small clearance. For example, the TTL clearance may be less than approximately 0.5 percent of a diameter of a bore of the cylinder. By way of another example, the TTL clearance for an aluminum piston may be approximately 0.36 to 0.5 percent of the diameter of the bore of the cylinder. By way of another example, the TTL clearance for a steel piston may be approximately 0.2 to 0.32 percent of the diameter of the bore of the cylinder. The TTL clearance may control a temperature within the channels and/or a residence time of oil within the channels, which, in turn, may block the formation of carbon deposits within the channels. Thus, the TTL clearance may enable durable, reliable operation of the channels during an operating life of the engine. Advantageously, the engine having the features disclosed herein may have increased stability of the top ring, which in turn may block radial ring collapse, as well as reduce blowby, oil consumption, emissions, for example.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Together, the piston 20 and the cylinder 26 may form a power cylinder system for the engine 10. As discussed in more detail below, one or more channels may be provided to stabilize a top ring of the piston 20, and a TTL clearance may be provided between a top land of the piston 20 and an inner annular wall of the cylinder to block formation of carbon deposits within the one or more channels. Further, the shaft 22 may be coupled to a load 24, which is powered via rotation of the shaft 22. For example, the load 24 may be any suitable device that may generate power via the rotational output of the engine 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. In certain embodiments, the piston 20 may be a steel piston or an aluminum piston with a Ni-resist ring insert in a top ring groove of the piston 20. The system 8 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, or 900 RPM. In some embodiments, the engine 10 may operate between approximately 800-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

Figure 2:
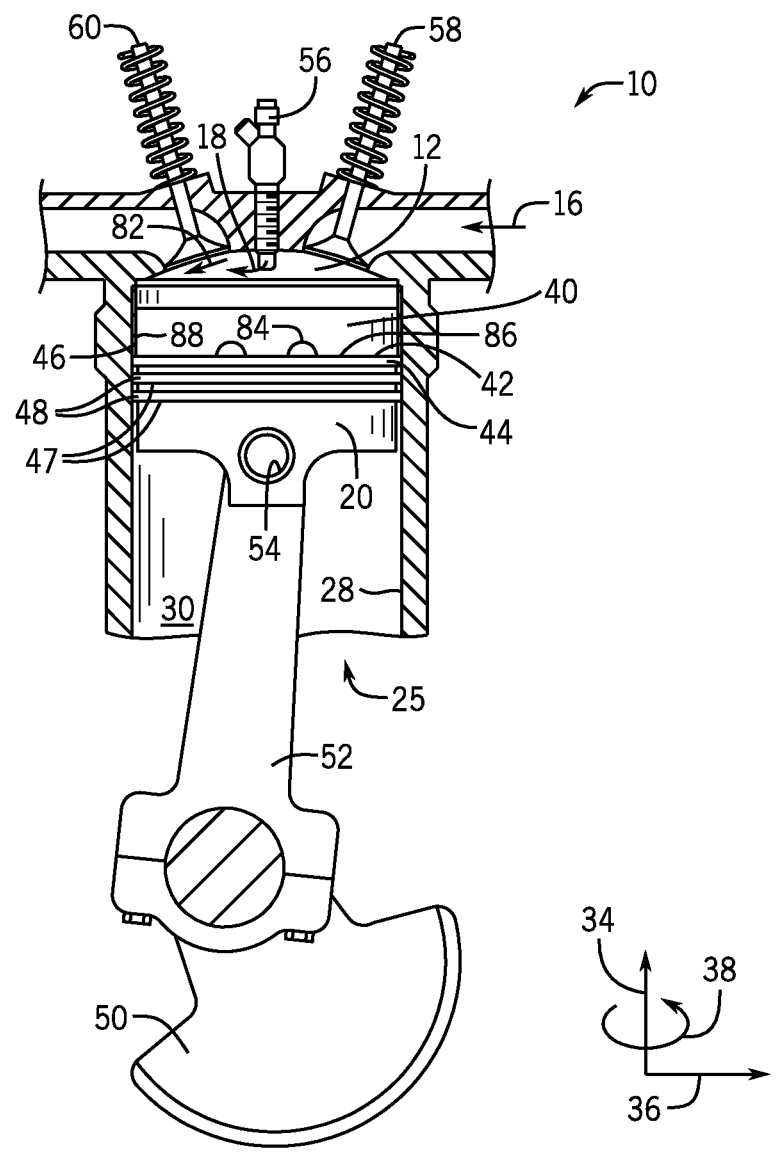
FIG. 2 is a cross-sectional side view of an embodiment of a tight top land piston assembly having a piston positioned within a cylinder of an engine.

FIG. 2 is a cross-sectional side view of an embodiment of a piston assembly 25 having the piston 20 disposed within a cylinder 26 (e.g., an engine cylinder) of the engine 10. The cylinder 26 has an inner annular wall 28 defining a cylindrical cavity 30. In the following discussion, reference may be made to an axial axis or direction 34, a radial axis or direction 36, and a circumferential axis or direction 38. The piston 20 includes a top portion 40 (e.g., a top land) and a first annular groove 42 (e.g., a top groove or a top ring groove) extending circumferentially (e.g., in the circumferential direction 38) about the piston 20 beneath the top land 40. A first ring 44 (e.g., a top ring or a top piston ring) may be positioned in and supported by the top groove 42. The top ring 44, the top land 40, and the inner annular wall 28 of the cylinder 26 define an annular top land cavity 46. As shown, the piston 20 includes a plurality of additional annular grooves 47 (e.g., additional ring grooves) extending circumferentially about the piston 20 and spaced apart from the top groove 42 and from one another along the axial axis 34. An additional piston ring 48 is positioned in each of the additional grooves 47. Various features are disclosed herein with respect to the top groove 42 and the top ring 44. However, it should be understood that the plurality of additional grooves 47 and the corresponding additional piston rings 48 may have any of a variety of configurations. For example, one or more of the plurality of additional grooves 47 and/or corresponding additional rings 48 may include some or all of the features disclosed below or may have different configurations, shapes, sizes, and/or functions, for example.

As shown, the piston 20 is attached to a crankshaft 50 via a connecting rod 52 and a pin 54. The crankshaft 50 translates the reciprocating linear motion of the piston 20 into a rotating motion. The combustion chamber 12 is positioned adjacent to the top land 40 of the piston 20. A fuel injector 56 provides the fuel 18 to the combustion chamber 12 and a valve 58 controls the delivery of air 16 to the combustion chamber 12. An exhaust valve 60 controls discharge of exhaust from the engine 10. However, it should be understood that any suitable elements and/or techniques for providing fuel 18 and air 16 to the combustion chamber 12 and/or for discharging exhaust may be utilized.

In operation, combustion of the fuel 18 with the air 16 in the combustion chamber 12 cause the piston 20 to move in a reciprocating manner (e.g., back and forth) in the axial direction 34 within the cavity 30 of the cylinder 26. As the piston 20 moves, the crankshaft 50 rotates to power the load 24 (shown in FIG. 1). The top ring 44 is configured to protrude from the top groove 42 and to contact the inner annular wall 28 of the cylinder 26. The top ring 44 is generally configured to block the fuel 18 and the air 16, or a fuel-air mixture 82, from escaping from the combustion chamber 12 and/or facilitates maintenance of suitable pressure (e.g., compression) to enable the expanding hot combustion gases to cause the reciprocating motion of the piston 20. Furthermore, the top ring 44 generally facilitates scraping of oil, which coats the inner annular wall 28 and which controls heat and/or friction within the engine 10, for example. During operation of the engine 10, the top ring 44 is subjected to high temperatures and high pressure combustion gases. Without the disclosed embodiments, the high pressure exerted against the top ring 44 may lead to radial ring collapse (e.g., movement of the top ring 44 away from the inner wall 28 of the cylinder 26 along the radial axis 36) and/or ring lift or ring flutter (e.g., movement of the top ring 44 within the top groove 42 along the axial axis 34). Such movement or instability of the top ring 44 may, in turn, result in increased oil consumption, increased emissions, increased blowby, and/or increased wear of components of the engine 10, for example.

With the foregoing in mind, the piston assembly 25 may include one or more radial channels 84 (e.g., passageways, troughs, grooves, or the like) that are configured to stabilize the top ring 44. As discussed in more detail below, the radial channels 84 enable transfer of combustion gases from the annular top land cavity 46 to a space (shown in FIG. 4), where the combustion gases exert a radially-outward force against an inner face (shown in FIG. 4) of the top ring 44. Thus, the radial channels 84 may facilitate control of a pressure gradient across the top ring 44 and may stabilize the top ring 44 within the top ring groove 42. The piston assembly 25 may also be a TTL piston assembly 25, as discussed in more detail below.

Figure 3:
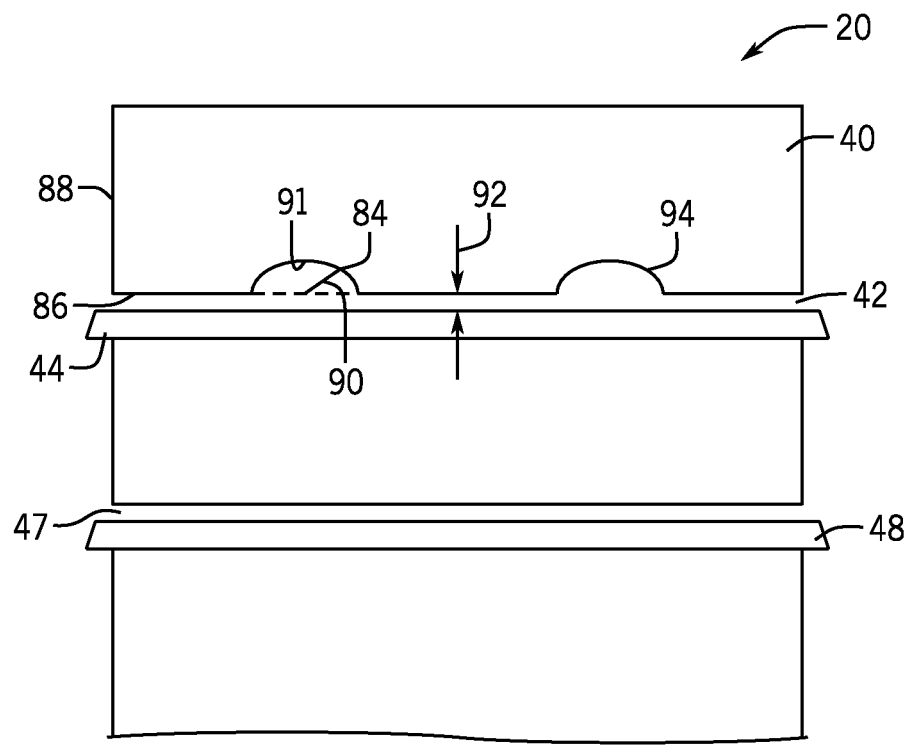
FIG. 3 is a side view of a portion of an embodiment of a piston having radial channels formed in a top land of the piston.
Figure 3:
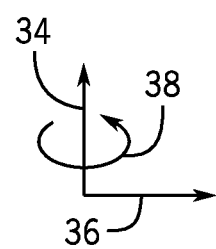

FIG. 3 is a perspective view of a portion of an embodiment of the piston 20 having radial channels 84 formed in the top land 40 of the piston 20. As shown, the radial channels 84 are formed along an axially-facing surface 86 (e.g., an annular surface), which corresponds to both a bottom surface of the top land 40 of the piston 20 and an upper surface (e.g., top surface or top perimeter) of the top groove 42. The radial channels 84 are spaced apart circumferentially (e.g., along the circumferential axis 38) about the axially-facing surface 86 and extend radially-inward (e.g., along the radial axis 36) from an outer surface 88 of the top land 40 of the piston 20. The radial channels 84 have a curved cross-sectional shape with a radius of curvature 90 (e.g., the radial channels 84 have a curved wall 91), and the curved cross-sectional shape extends in the radial direction 36. As shown, the radial channels 84 are open toward the top groove 42. An axial distance 92 between the top ring 44 and the axially-facing surface 86 may vary circumferentially (e.g., along the circumferential axis 38) about the top ring 44 (e.g., as shown by a first axial distance 92 and a second axial distance 94, greater than the first axial distance 92 and coincident with the radial channels 84). Additionally, the first axial distance 92 between the axially-facing surface 86 and the top ring 44 may be configured to enable some degree of expansion and contraction of the top ring 44 due to the high temperatures and pressures during operation of the engine 10, while blocking excessive ring lift or ring flutter. Accordingly, the radial channels 84 facilitate transfer of the combustion gases from the cavity 30 along the radial channels 84 to decrease the pressure gradient across the top ring 44 and may also enable the first axial distance 92 to be minimized to limit ring lift.

Although the radial channels 84 are shown as having a curved cross-section and the radius of curvature 90, it should be understood that the radial channels 84 may have any suitable cross-section or configuration that facilitates transfer of the combustion gases in the manner disclosed herein. Furthermore, although multiple radial channels 84 are illustrated, it should be understood that any number of radial channels 84 may be provided, such as 1, 2, 3, 4, 5, 6, 7, 8, 9, 10, or more. Additionally, the radial channels 84 may be distributed in any suitable manner, including a uniform circumferential spacing about the piston 20.

However, in some circumstances, the lubricating oil and certain fuels used in the engine 10 may produce carbon deposits. For example, the high temperature and/or high pressure conditions within the engine 10 may facilitate carbonization of incompletely burned fuel and/or the oil on the inner annular wall 28 of the cylinder 26. Accordingly, it may be desirable to provide certain features that reduce temperature and/or oil residence time within the radial channels 84. Such features may block the formation of carbon deposits within the radial channels 84 and enable reliable transfer of the combustion gases through the radial channels 84.

Figure 4:
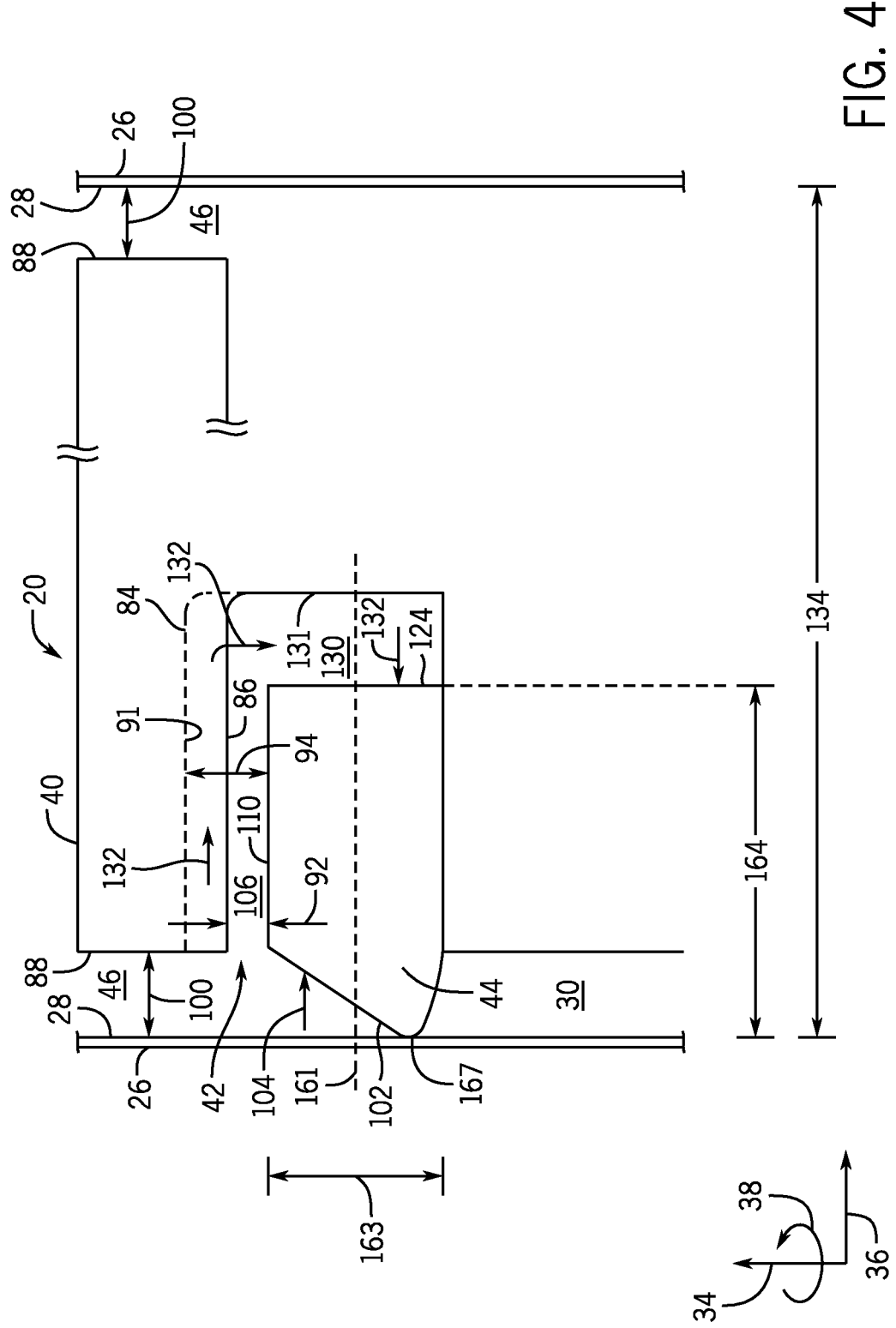
FIG. 4 is a partial cross-sectional side view of a portion of an embodiment of a tight top land piston assembly having a radial channel formed in a top land of a piston.

With the foregoing in mind, FIG. 4 is a partial cross-sectional side view of a portion of an embodiment of the TTL piston assembly 25 having the piston 20 with radial channels 84 and a TTL clearance 100 (e.g., a radial clearance defining an annular space). The TTL clearance 100 is sufficiently small to effectively block or minimize the formation of carbon deposits within the radial channels 84. In the illustrated embodiments, the radial channels 84 are formed in the axially-facing surface 86 of the piston 20. The radial channels 84 extend radially-inwardly (e.g., along the radial axis 36) from the outer surface 88 of the top land 40. During operation of the engine 10, combustion gases exert pressure on an outer face 102 (e.g., a radially outer face or an outer circumferential face) of the top ring 44 and generate a radially-inward force 104 that drives the top ring 44 away from the inner annular wall 28 of the cylinder 26.

Although a gap 106 is provided between a top face 110 (e.g., an axially upper face) of the top ring 44 and the axially-facing surface 86 of the piston 20 to accommodate expansion (e.g., due to fluctuations in temperature or the like) of the top ring 44 within the top groove 42, the first axial distance 92 across the gap 106 is desirably configured to minimize ring lift and flutter, and thus may not enable efficient transfer of the combustion gases to an inner face 124 (e.g., a radially inner face or an inner circumferential face) of the top ring 44. Accordingly, without the disclosed channels 84, a large pressure differential may exist across the top ring 44 (e.g., between the outer face 102 and the inner face 124). For example, without the disclosed channels 84, the pressure adjacent to the outer face 102 may be greater than the pressure adjacent to the inner face 124. In such cases, the top ring 44 may be susceptible to radial ring collapse, which in turn results in increased oil consumption and blowby, for example. Thus, the radial channels 84 may be configured to facilitate transfer of the combustion gases to a space 130 (e.g., an annular space) adjacent to the inner face 124 of the top ring 44 and an inner wall 131 (e.g., an inner annular wall) of the top groove 42, which may provide increased stability of the top ring 44. The combustion gases in the space 130 may exert a radially-outward force 132 to balance or to counter the radially-inward force 104, and the pressure across the top ring 44 may be substantially equal or otherwise controlled to block radial ring collapse, for example.

To block carbon deposit buildup in the radial channels 84 and/or to enable reliable transfer of the combustion gases through the radial channels 84, the radial channels 84 may be used in conjunction with the TTL clearance 100. As shown, the TTL clearance 100 is a diametral clearance (e.g., two times a radial clearance) between the inner annular wall 28 of the cylinder 26 and the outer surface 88 of the top land 40 of the piston 20 (e.g., across the top land cavity 46). The TTL clearance 100 may vary based on the material of the piston assembly 25, such as the material of the piston 20. When the piston 20 includes aluminum, for example, the TTL clearance 100 is a diametral cold clearance (e.g., diametral clearance at room temperature when the engine is not running) between approximately 0.36-0.5 percent of a nominal bore diameter 134 of the cylinder 26. For alternate materials, such as steel, the TTL clearance 100 may be scaled based on a ratio of thermal expansion coefficients between the alternative material and aluminum. For example, where the piston 20 is made from steel having a thermal expansion coefficient of $13.2^{-6}$ K, the TTL clearance 100 may be scaled by multiplying the TTL clearance 100 for the aluminum piston 20 by $13.2^{-6}/21^{-6}$ (or about 0.628), where $21^{-6}$ K is the thermal expansion coefficient of the aluminum used to form the aluminum piston 20. For example, the TTL clearance for a steel piston may be approximately 0.2 to 0.32 percent of the nominal bore diameter 134. In some embodiments, the TTL clearance 100 is less than approximately 25 micrometers (μm) during operation of the engine 10 (e.g., at a rated temperature of the engine 10). In certain embodiments, the TTL clearance 100 is less than approximately 50 μm, 40 μm, 30 μm, 20 μm, 15 μm, 10 μm, or less during operation of the engine 10 at the rated temperature. In other embodiments, the TTL clearance 100 is between about 5 and 50 μm, 10 and 40 μm, 15 and 35 μm, or 20 and 30 μm during operation of the engine at the rated temperature.

It should be understood that in certain operating conditions, it may be desirable for the piston 20 to be positioned within the cylinder 26 such that the diametral clearance is less than or greater than the TTL clearance 100 disclosed above. For example, under certain operating conditions, the diametral clearance between the inner annular wall 28 of the cylinder 26 and the outer surface 88 of the top land 40 of the piston 20 (e.g., across the top land cavity 46) may be a diametral cold (e.g., room temperature) clearance between approximately 0.1 percent and 0.7 percent, 0.1 percent and 0.35 percent, or 0.5 percent and 0.7 percent of a nominal bore diameter 134 of the cylinder 26. Such diametral clearances be used in conjunction with the radial channels 84 in certain cases or under certain operating conditions, such as when the radial channels 84 have larger dimensions (e.g., larger flow volume) and/or are positioned in low deposit regions of the piston assembly 25 (e.g., low temperature and/or low oil regions), for example. Additionally, certain engines having such diametral cold clearances may exhibit the radial clearance of 25 microns during operation of the engine 10 at rated temperatures and/or under certain operating conditions of the engine 10, and thus may reduce or limit formation of carbon deposits.

The TTL clearance 100 may reduce piston temperature due to heat transfer from the top land 40 of the piston 20 to the cylinder 26. Additionally, the TTL clearance 100 may reduce residence time of oil on the top land 40, the top ring groove 42, and/or the radial channels 84 because the oil is replenished frequently as the piston 20 moves within the cylinder 26 (e.g., more frequently than engines 10 without the TTL clearance 100 or with a diametral cold clearance of greater than approximately 0.5 percent or more of the nominal bore diameter 134). Thus, the TTL clearance 100 blocks carbon deposit buildup within the radial channels 84 and enables durable, reliable transfer of the combustion gases through the radial channels 84 during operation of the engine 10.

FIG. 5 is a partial cross-sectional side view of a portion of an embodiment of the TTL piston assembly 25 with a radial channel 140 formed in the top ring 44. In certain embodiments, one or more radial channels 84 may be formed along the top face 110 of the top ring 44. Such radial channels 84 may be provided in addition to or as an alternative to the radial channels 84 formed in the top land 40 of the piston 20, as shown in FIGS. 2-5, for example.

As shown, the radial channels 84 formed in the top ring 44 may extend radially-inward (e.g., in the radial direction 36) from the outer face 102 to the inner face 124 of the top ring 44. An axial distance 92 between the top ring 44 and the axially-facing surface 86 may vary circumferentially (e.g., along the circumferential axis 38) about the top ring 44 (e.g., as shown by the first axial distance 92 and the second axial distance 94, greater than the first axial distance 92 and coincident with the radial channels 84). Thus, the radial channels 84 may facilitate flow of the combustion gases from the cavity 30 to the space 130 adjacent to the inner face 124, as shown by arrow 162. As discussed above, the transfer of combustion gases to the space 130 may control the pressure differential between the outer face 102 and the inner face 124 of the top ring 44, and thus block radial ring collapse, for example.

As set forth above, the radial channels 84 formed in the axially-facing surface 86, the radial channels 84 formed in the top ring 44, and/or the axial channels 150 may help to equalize pressures or create pressure differential between the inner face 124 of the top ring 44 and the outer face 102 of the top ring 44, thereby helping to bias the top ring 44 radially-outward against the cylinder 26 to block radial ring collapse and/or blowby, for example. It should be understood that the radial channel 140 may be positioned in any suitable location to facilitate transfer of combustion gases to the space 130 adjacent to the inner face 124 of the top ring 44. Additionally, any suitable number of the radial channels 84 formed in the top ring 44 and/or the axial channels 150 may be provided. For example, 1, 2, 3, 4, 5, 6, 7, 8, 9, 10 or more radial channels 84 may be provided. The radial channels 84 in the top ring 44 and/or the radial channels 84 in the axially-facing surface 86 of the piston 20 may be spaced apart at discrete locations about the circumference of the piston 20, and in some cases, may be spaced apart at uniform distances from one another.

Furthermore, various low friction coatings may be utilized in addition to the radial channels 84, 140 and/or the axial channels 150 disclosed herein.

In the illustrated embodiment, the TTL clearance 100 is provided to block the formation of carbon deposits in the radial channels. For example, the TTL clearance 100 may reduce piston 20 temperature due to heat transfer from the top land 40 of the piston 20 to the cylinder 26. Additionally, the TTL clearance 100 may reduce residence time of oil on the top land 40, the top ring groove 42, and/or the radial channels 84 because the oil is replenished frequently as the piston 20 moves within the cylinder 26 (e.g., more frequently than engines 10 without the TTL clearance 100 or with a diametral cold clearance of approximately 0.8% or more of the nominal bore diameter 134). Thus, the TTL clearance 100 blocks carbon deposit buildup within the radial channels 84 and enables durable, reliable transfer of the combustion gases through the radial channels 84 and/or the axial channels 150 during operation of the engine 10.

Additionally, as shown in FIGS. 4 and 5, the top ring 44 may have an asymmetrical profile (e.g., an asymmetrical cross-section) about a radial axis 161, such as a tapered profile or partially tapered profile (e.g., a conical profile), that is configured to effectively and efficiently scrape oil from an inner wall of the cylinder during a down-stroke (e.g., an expansion stroke) of the piston. As shown, the top ring 44 is tapered across a height 163 of the top ring 44. A radius 164 (and thus a diameter) of the top ring 44 increases between a top face 110 and a bottom face 165 of the top ring 44. The smallest radius 164 of the top ring 44 coincides with the top face 110, while the largest radius 164 of the top ring 44 coincides with the bottom face 112. In such a configuration, the outer surface 90 is configured to contact the inner annular wall 28 to form a sealing point 167 (e.g., an annular seal) at or proximate to the bottom face 112 of the top ring 44. In the illustrated embodiment, the outer face 102 has a linear profile, although the profile may be stepped or curved (e.g., convex or concave). Although the tapered profile or partially tapered profile may cause a pressure gradient across the top ring 44 the radial channels 84 may be configured to transfer combustion gases to the space 130 to control the pressure across the top ring 44 and to stabilize the top ring 44, in the manner set forth above.

Technical effects of the disclosed embodiments include providing systems for controlling the distribution of combustion gases within the engine 10 via one or more channels, such as the radial channels 84. The combustion gases may exert pressure against the outer face 102 of the top ring 44 of the TTL piston assembly 25. The radial channels 84 may transfer the combustion gases to the space 130 adjacent to the inner surface 124 of the top ring 44, thus controlling the pressure gradient between the outer face 102 and the inner face 124 of the top ring 44. The TTL piston assembly 25 includes the TTL clearance 100 between the top land 40 of the piston 20 and the inner annular wall 28 of the cylinder 26. The TTL clearance 100 advantageously reduces the temperature of the piston 20 and/or replenishes oil in the vicinity of the radial channels 84, and thus, blocks carbon deposit buildup in the radial channels 84 and/or the axial channels 150. Thus, the radial channels 84 and/or the TTL clearance 100 may enable durable, reliable transfer of combustion gases about the top ring 44 and increase stability of the top ring 44. Such a configuration may also advantageously reduce oil consumption, emissions, blowby, and/or friction within the engine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power cylinder system for a reciprocating engine, comprising:
   a cylinder having an inner annular wall and defining a cavity having a bore diameter;
   a piston assembly, comprising:
      a piston disposed within the cylinder and configured to move in a reciprocating manner within the cylinder, wherein the piston and the inner annular wall are separated by a diametral cold clearance that is less than approximately 0.5 percent of the bore diameter;
      a top-most groove extending circumferentially about the piston beneath a top land of the piston;
      a ring disposed within the top-most groove, wherein the ring is configured to contact the inner annular wall of the cylinder as the piston moves within the cylinder; and
      one or more channels formed in the top land or an upper surface of the ring, wherein the one or more channels are configured to enable combustion gases to flow from the cavity to a space between an inner surface of the top-most groove and an inner face of the ring, and wherein each of the one or more channels is positioned at a discrete location about a circumference of the piston and extends about less than the circumference of the piston.

2. The system of claim 1, wherein the piston is an aluminum piston, the piston assembly is a tight top land piston assembly, and the diametral cold clearance between an outer surface of the top land of the piston and the inner annular wall of the cylinder is approximately 0.36 percent to 0.5 percent of the bore diameter.

3. The system of claim 1, wherein the piston is a steel piston, the piston assembly is a tight top land piston assembly, and the diametral cold clearance between an outer surface of the top land of the piston and the inner annular wall of the cylinder is approximately 0.2 percent to 0.32 percent of the bore diameter.

4. The system of claim 1, wherein a radial clearance between an outer surface of the top land of the piston and the inner annular wall of the cylinder is less than approximately 25 micrometers during operation of the reciprocating engine at a rated temperature.

5. The system of claim 1, wherein the one or more channels are open to the top-most groove.

6. The system of claim 1, wherein at least some of the one or more channels extend radially in a top surface of the top-most groove.

7. The system of claim 1, wherein each of the one or more channels comprises a curved cross-sectional shape having a radius of curvature and extends along a radial axis of the piston.

8. The system of claim 1, comprising one or more additional grooves extending circumferentially about the piston, wherein each of the one or more additional grooves is configured to support a respective additional ring.

9. The system of claim 1, wherein the one or more channels comprise multiple channels spaced apart at uniform distances from one another about the circumference of the piston.

10. A power cylinder system for a reciprocating engine, comprising:
a piston configured to form a tight top land clearance between a top land of the piston and an inner annular wall of a cylinder of the power cylinder system when the piston is positioned within the cylinder, wherein the piston is an aluminum piston and the tight top land clearance is a diametral cold clearance between the outer perimeter of the top land of the piston and the inner annular wall of the cylinder of approximately 0.36 percent to 0.5 percent of a bore diameter of the cylinder;
a top-most ring groove extending circumferentially about the piston and configured to support a ring; and
one or more channels positioned in an upper surface of the top-most ring groove, wherein the one or more channels are open to the top-most ring groove and extend inwardly from an outer perimeter of the piston to a space defined between a portion of the top-most ring groove and an inner circumferential face of the ring when the ring is disposed within the top-most ring groove, and wherein each of the one or more channels is positioned at a discrete location about a circumference of the piston and extends about less than the circumference of the piston.

11. The system of claim 10, wherein a radial clearance between the outer perimeter of the top land of the piston and the inner annular wall of the cylinder is less than approximately 25 micrometers during operation of the system at a rated temperature.

12. The system of claim 10, comprising the ring, wherein one or more additional channels extend into a top surface of the ring to the space.

13. The system of claim 10, wherein each of the one or more channels comprises a curved cross-sectional shape having a radius of curvature and extends along a radial axis of the piston.

14. The system of claim 10, wherein the one or more channels comprise multiple channels spaced apart at uniform distances from one another about the circumference of the piston.

15. A power cylinder system for a reciprocating engine, comprising:
a cylinder having a bore diameter:
a piston positioned within the cylinder, wherein the piston is a steel piston, and a tight top land clearance is provided between a top land of the piston and an inner annular wall of the cylinder such that an outer surface of the top land of the piston and the inner annular wall of the cylinder are separated by a diametral cold clearance of less than approximately 0.32 percent of the bore diameter;
a ring positioned within a top-most groove of the piston beneath the top land of the piston, wherein the inner annular wall of the cylinder, the ring, and the top land define a top land cavity; and
one or more radial channels in fluid communication with the top land cavity and a space defined in part by an inner face of the ring, wherein the one or more radial channels are configured to facilitate transfer of combustion gases from the top land cavity to the space.

16. The system of claim 15, wherein the outer surface of the top land of the tight top land piston and the inner annular wall of the cylinder are separated by a radial clearance of less than approximately 25 micrometers during operation of the system at a rated temperature.

17. The system of claim 15, wherein at least some of the one or more radial channels extend into a top surface of the top-most groove.

18. The system of claim 15, wherein at least some of the one or more radial channels extend into a top surface of the ring.

19. The system of claim 15, wherein the tight top land clearance is based on a ratio of a first thermal expansion coefficient of steel and a second thermal expansion coefficient of aluminum.

20. The system of claim 15, wherein each of the one or more radial channels comprises a curved cross-sectional shape having a radius of curvature and extends along a radial axis of the piston.

* * * * *